(12) United States Patent
Griffiths et al.

(10) Patent No.: US 7,387,565 B1
(45) Date of Patent: Jun. 17, 2008

(54) STRIKER ATTACHMENT ASSEMBLY

(76) Inventors: Terry Cemlyn Griffiths, 2762 Elberton Rd., Carlton, GA (US) 30627; Gary Martin Gilbreth, 71 Fox Run Dr., Claxton, GA (US) 30417

( * ) Notice: Subject to any disclaimer, the term of this patent is extended or adjusted under 35 U.S.C. 154(b) by 0 days.

(21) Appl. No.: 11/758,201

(22) Filed: Jun. 5, 2007

(51) Int. Cl.
*A22C 21/02* (2006.01)
(52) U.S. Cl. ............................................ 452/87
(58) Field of Classification Search ............. 452/82–93
See application file for complete search history.

(56) References Cited

U.S. PATENT DOCUMENTS

| | | | | | |
|---|---|---|---|---|---|
| 2,554,671 | A | * | 5/1951 | Hodges | 452/93 |
| 3,840,938 | A | * | 10/1974 | Carlson | 452/93 |
| 4,292,709 | A | * | 10/1981 | van Mil | 452/91 |
| 7,066,805 | B2 | * | 6/2006 | Turner | 452/88 |
| 7,070,494 | B2 | * | 7/2006 | Rapp et al. | 452/88 |
| 7,121,941 | B2 | * | 10/2006 | Turner | 452/88 |

* cited by examiner

*Primary Examiner*—Thomas Price
(74) *Attorney, Agent, or Firm*—Ronald E. Smith; Smith & Hopen, P.A.

(57) ABSTRACT

A striker assembly includes a striker having a main body, a head, and teeth formed in the main body. A "U"-shaped channel is formed in a top wall of the head to accommodate a movable first elongate metal bar and in a bottom wall of the head to accommodate a stationary second elongate metal bar. An undercut is formed in open communication with the channel that accommodates the second elongate metal bar. A plurality of longitudinally spaced apart circular discs is positioned in a plane perpendicular to a longitudinal axis. Each disc has slots formed in it to accommodate opposite ends of the first and second elongate metal bars. The slot that accommodates the first elongate metal bar enables it to be displaced circumferentially and radially so that a striker can be replaced and it is moved back into its operative position after the striker has been replaced.

9 Claims, 6 Drawing Sheets

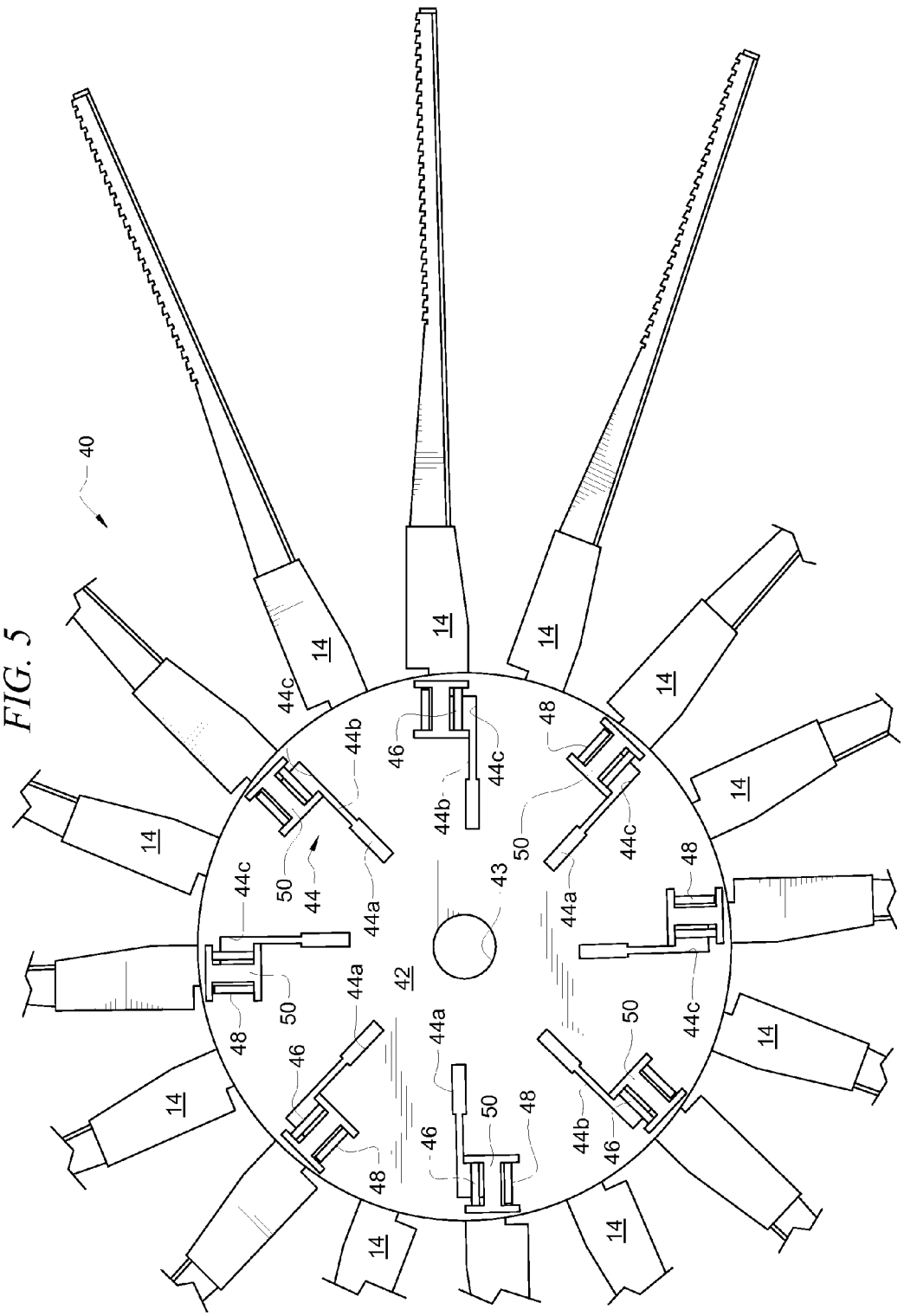

STRIKER ATTACHMENT ASSEMBLY

BACKGROUND OF THE INVENTION

1. Field of the Invention

This invention relates generally to devices that remove dirt, debris, contaminates, and the like from animal carcasses. More particularly, it relates to a striker assembly that includes a plurality of strikers mounted in radial relation to a rotatable frame so that rotation of the frame causes the strikers to repeatedly strike the hide of a carcass passing through a processing facility.

2. Description of the Prior Art

Small rotating fingers known as picking fingers are used in the poultry industry to remove feathers from chickens and the like in processing facilities. The machines that include such picking fingers are known as automatic defeathering machines. Larger rotating fingers known as whips are used in the pork industry for hair removal.

Conventional picking fingers or whips are attached to rotating drums or frames and extend radially therefrom relative to an axis of rotation thereof so that a carcass is repeatedly struck by the picking fingers or whips as the carcass is carried on a conveyor through a processing station.

Picking fingers have a head that is forced through an opening formed in a metal bar to seat in a recess under a head or a rim. When the picking fingers become worn and require replacement, they must be cut from the head using a knife or shears.

When whips are worn and in need of replacement, an elongate attachment rod that passes through a bore formed in the head of the whip must be removed from its engagement with the striker assembly.

There is a need for a striker assembly that facilitates replacement of worn out strikers.

More specifically, there is a need for a striker assembly that does not require cutting of the strikers with a knife or other cutting instrument when worn strikers are replaced. There is also a need for a striker assembly that does not require removal of elongate attachment rods when a striker requires replacement.

However, in view of the art considered as a whole at the time the present invention was made, it was not obvious to those of ordinary skill in this art how the identified needs could be met.

SUMMARY OF INVENTION

The long-standing but heretofore unfulfilled need for an improved striker assembly is now provided in the form of a new, useful, and nonobvious invention.

The novel assembly includes a plurality of circular discs that are parallel to and longitudinally spaced apart from one another. Contiguous circular discs are interconnected to one another by a plurality of longitudinally-disposed elongate metal bars having opposite ends that are received within slots formed in the circular discs, near an outer peripheral edge of each disc. The elongate metal bars are grouped into pairs of bars and the pairs are circumferentially and equidistantly spaced relative to one another. The circular discs and interconnecting bars collectively form a cylindrical frame mounted for motor-driven rotation about a longitudinal axis of symmetry. Each pair of bars holds at least one radially disposed striker between them in sandwiched relation thereto. When the frame rotates, the strikers flail against a carcass, removing dirt, debris, contaminates or the like therefrom.

The novel striker has an elongate main body formed by two parallel members and a head formed integrally with the elongate main body. Each member of the pair of parallel members has a bottom wall within which is formed a plurality of striker teeth. A square, upwardly-opening "U"-shaped channel is formed in a top wall of the head and a square, downwardly-opening "U"-shaped channel is formed in a bottom wall of the head. An undercut that extends in a radially inward direction is formed in open communication with the downwardly-opening channel.

Each slot formed in a circular disc is radially disposed relative to the longitudinal axis of symmetry of the cylindrical frame, said axis being the axis of rotation of said frame. The slots are grouped into pairs and the pairs are equidistantly and circumferentially spaced with respect to one another. Each pair of slots includes one elongate slot and one truncate slot.

Each elongate slot of each pair of slots has three parts, including a radially innermost part, a radially outermost part, and a middle part that openly communicates with the inner and outermost parts.

A first elongate metal bar has a parallelepiped structure and a length greater than a distance separating contiguous discs. It has opposite ends adapted to slidingly fit within the elongate slot of each pair of slots. The radially outermost part of each elongate slot has a circumferential extent about twice the thickness of the first metal bar. The radially innermost part of the elongate slot has a circumferential extent less than that of the radially outermost part but greater than a thickness of the first metal bar. The middle part of the elongate slot has a circumferential extent only slightly greater than the thickness of the first metal bar. Each of the first elongate metal bars have their respective opposite ends positioned within the radially outermost part of their respective elongate slots when the assembly is in its operative configuration, thereby positioning each end of each first elongate metal bar in juxtaposition with an end of a second elongate metal bar.

A second elongate metal bar has the same structure as the first elongate metal bar and therefore has a parallelepiped structure and a length greater than a distance separating contiguous discs. Opposite ends of the second elongate metal bar slidingly fit within longitudinally-aligned truncate slots of each pair of slots of contiguous circular discs. The truncate slots are just large enough to accommodate the opposite ends of the second elongate metal bar. Accordingly, the truncate slots constrain the respective second elongate metal bars from circumferential or radial movement.

The second elongate bar is welded into place when it is properly positioned. Significantly, when a striker requires replacement, said second elongate bar need not be moved. Accordingly, its position in the assembly is permanent.

A yoking device secures the first and second elongate metal bars of each pair grouping of elongate metal bars to one another at their respective opposite ends. The second elongate metal bar, being confined within its truncate slot and being welded so that it cannot be displaced, is thus held against circumferential or radial movement. The yoking device therefore yokes the first elongate metal bar to the second elongate metal bar, thereby restricting the first elongate metal bar against such circumferential or radial movement. The yoking device also prevents the first and second elongate metal bars from sliding longitudinally in their respective slots. The head of the striker is compressed between the first and second elongate metal bars when the yoking device is performing its yoking function and this compression holds each striker in place.

To install a new striker, the head of the striker is lowered onto the second elongate metal bar so that the second elongate metal bar is introduced straight into the downwardly-opening channel formed in the head bottom wall and the striker is then displaced radially outwardly so that a radially innermost edge of the second elongate metal bar slides into the undercut, thereby locking the second elongate metal bar into the undercut and the downwardly-opening channel formed in the head of the striker.

The first elongate metal bar is then displaced radially outwardly from its radially-inward part of the elongate slot and thereby introduced into overlying relation to the striker head top wall. An extent thereof is positioned in the upwardly-opening square "U"-shaped channel formed in the striker head top wall when opposite ends of the first elongate metal bar are in their respective radially outermost part of the respective elongate slots. The head of each striker is thereby held in sandwiched relation between each pair of first and second elongate metal bars.

A striker is removed from the frame assembly by moving the first elongate metal bar circumferentially within the radially outermost part of its elongate slot until said first elongate metal bar aligns with the middle part of the elongate slot. The first elongate metal bar is then displaced radially inwardly so that its opposite ends enter into the radially innermost part of their respective elongate slots. This removes the first elongate metal bar from the upwardly-opening channel formed in the striker head and frees the striker to be displaced in a radially inward direction. Pushing the striker radially inwardly causes the undercut formed in the striker head to slide away from the stationary radially inner edge of the second elongate metal bar. The striker is then lifted from the downwardly-opening cavity so that it can be discarded, refurbished, or recycled.

An important object of this invention is to facilitate the replacement of strikers.

A closely related object is to provide a striker assembly that does not require disassembly of the striker assembly to replace a striker.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 5 is an end elevational view of the assembly depicted in FIG. 4.

DETAILED DESCRIPTION OF THE PREFERRED EMBODIMENT

Figure 1:
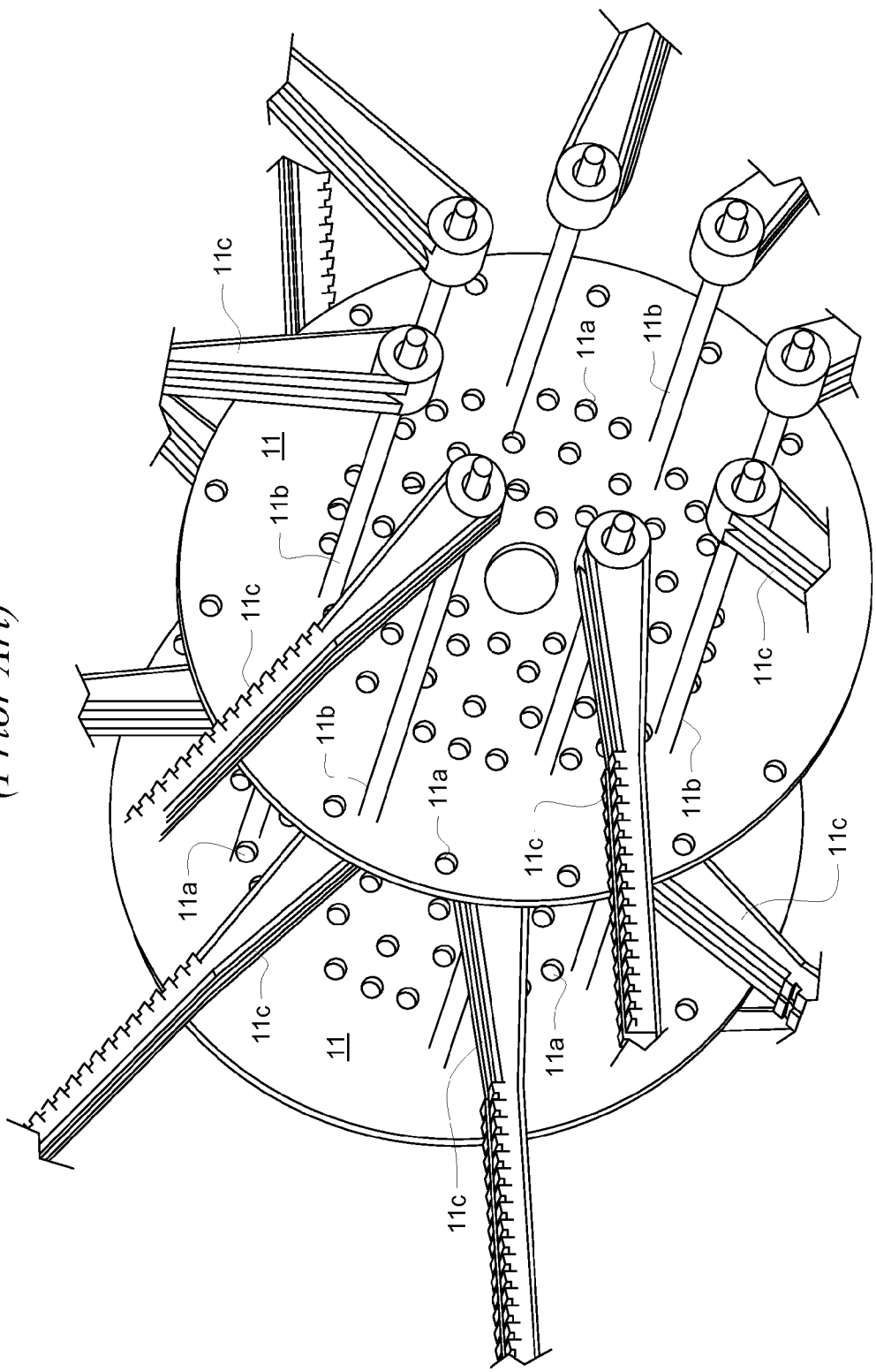
FIG. 1 is a perspective view of a prior art striker assembly known as a whip.

FIG. 1 is a perspective view of a prior art whip assembly of the type used in cleaning the skin of hogs. A plurality of rotatably mounted circular plates, collectively denoted 11, is centrally apertured and mounted on a drive shaft for conjoint rotation therewith. The drive shaft is not depicted to avoid cluttering the drawing. Multiple openings, denoted 11a, are formed in each circular plate 11 and some of them receive elongate attachment rods 11b therethrough. Accordingly, attachment rods 11b also rotate conjointly with circular plates 11. A plurality of whips 11c is mounted along the extent of each attachment rod 11b and said whips therefore strike a carcass that is transported along a path of travel parallel to the drive shaft in close proximity to circular plates 11.

The drawback of this prior art mounting is that attachment rods 11b must be removed when a whip 11c requires replacement.

Figure 2A:
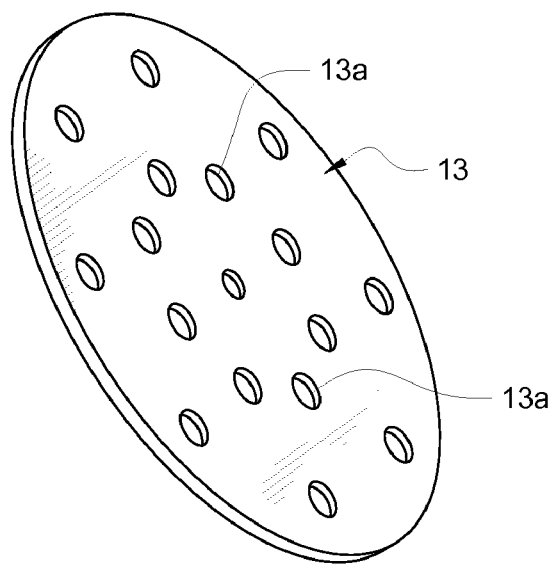
FIG. 2A is a perspective view of a prior art plate used in an automatic defeathering machine.
Figure 2B:
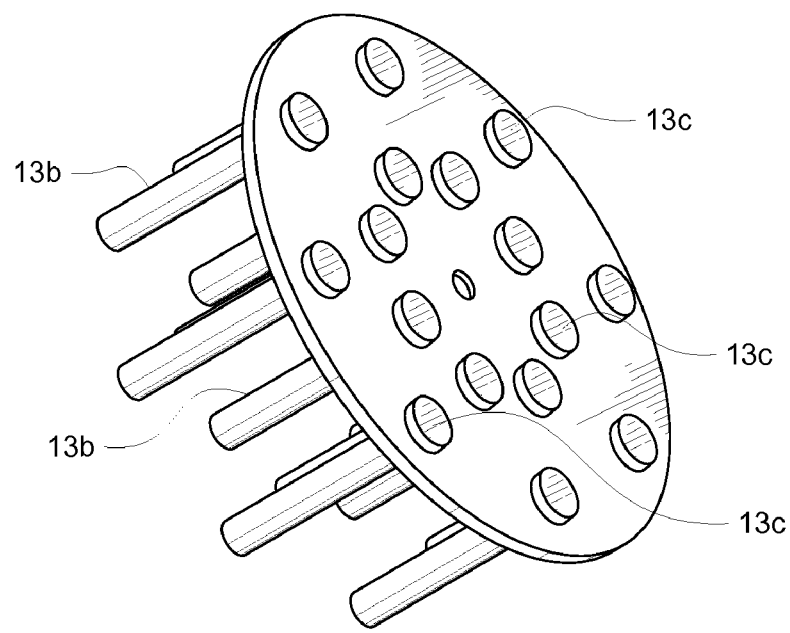
FIG. 2B is a perspective view of the prior art plate of FIG. 2A when fingers are positioned in the openings.

FIGS. 2A and 2B depict an apparatus that cleans the skin of poultry. Circular plate 13 includes multiple apertures 13a formed therein. As best understood in connection with FIG. 2B, apertures 13a receive elongate fingers 13b. Heads 13c are formed integrally with fingers 13b. When a finger 13b requires replacement, it must be cut from head 13c using a knife or shears.

Figure 3A:
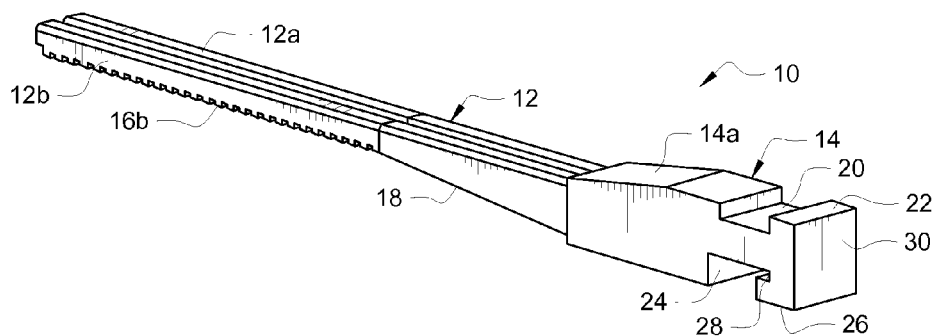
FIG. 3A is a perspective view of a novel striker.
Figure 3B:
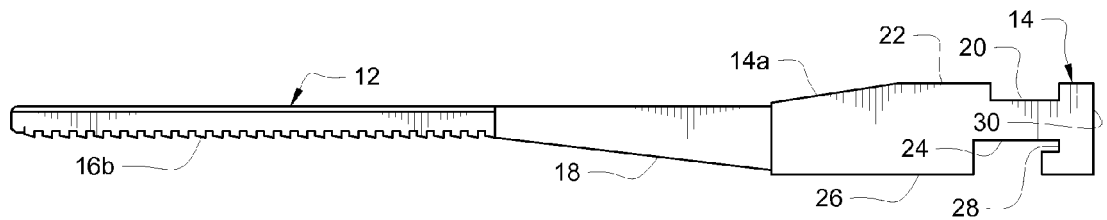
FIG. 3B is a side elevational view of the novel striker.
Figure 3C:
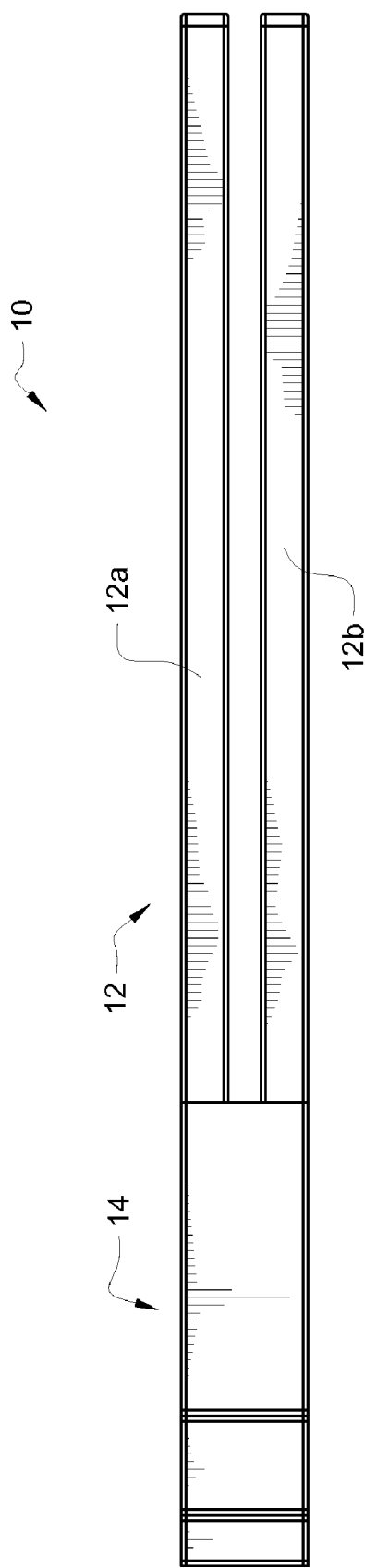
FIG. 3C is a top plan view thereof.

Referring now to FIGS. 3A-C, it will there be seen that an illustrative embodiment of the novel striker is denoted as a whole by the reference numeral 10.

Striker 10 has an elongate main body 12 and a head 14 formed integrally with said main body. As perhaps best depicted in FIG. 3C, main body 12 has two parts, denoted 12a and 12b, that are parallel to one another and spaced apart from one another by a distance that is about equal to the width of either part. This allows the striker to better conform to the contours of the carcass. Bottom walls 16a, not depicted, and 16b of main body parts 12a, 12b, respectively, are serrated or toothed for a majority of their respective extents. The teeth formed in said bottom walls strike a carcass when the strikers are rotating.

A proximal or radially-inward end 18 of parts 12a, 12b is smooth and does not contact the carcass when the striker is in use. Said radially inward end 18 of main body 12 gradually increases in thickness to form a mechanically sound connection with head 14.

Head 14 also increases in thickness in a radially inward direction as at 14a until it reaches a maximum thickness. Square, upwardly-opening "U"-shaped channel 20 is formed in top wall 22 of head 14 in the region of the head having said maximum thickness. A square, downwardly-opening "U"-shaped channel 24 is formed in bottom wall 26 of head 14, and a radially-inwardly extending undercut 28 is in open communication with said channel 24. Head 14 terminates in flat vertical end wall 30.

Figure 4:
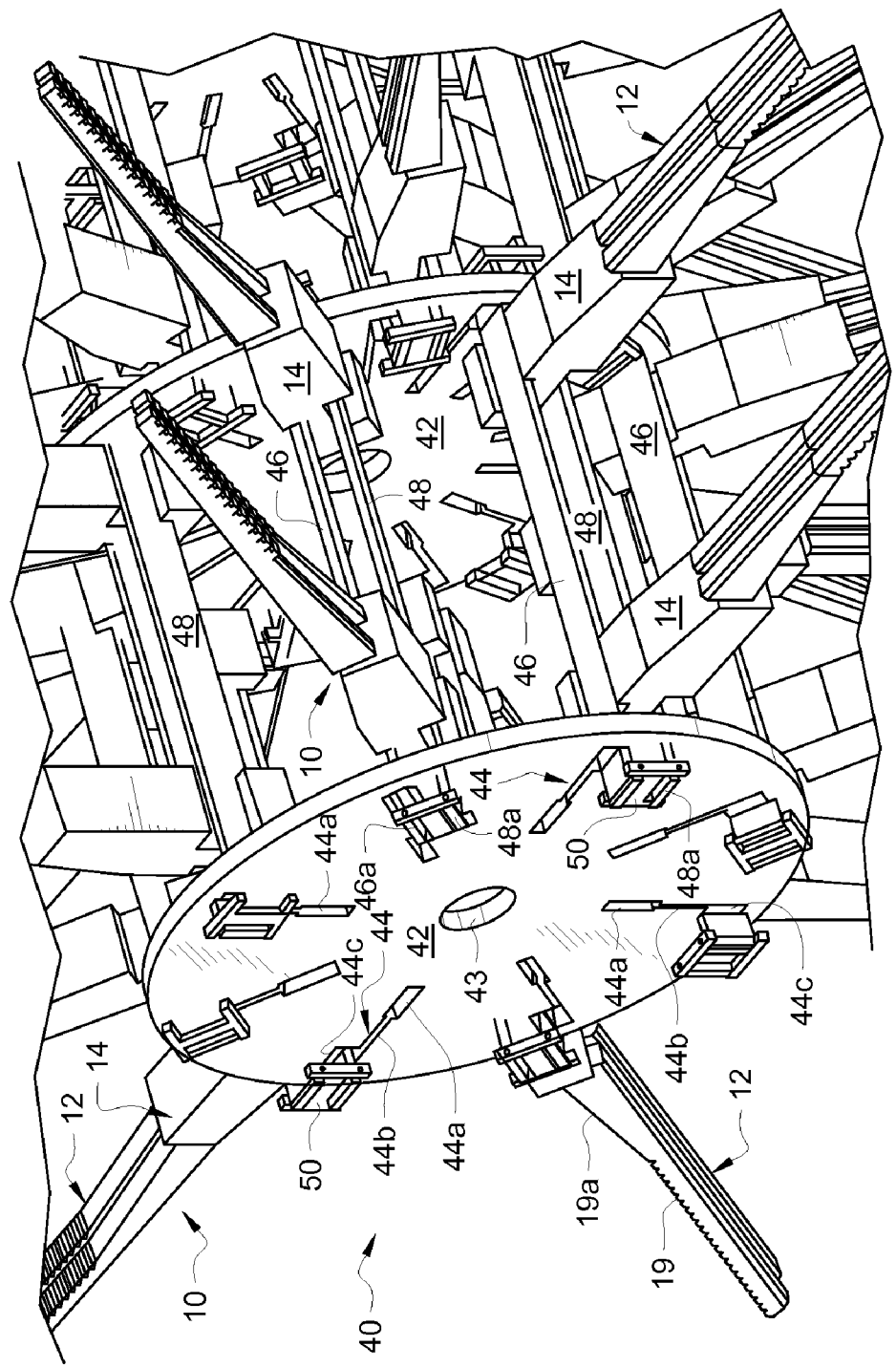
FIG. 4 is a perspective view of a striker assembly including a plurality of radially disposed strikers attached to a rotatable frame.

Referring now to FIGS. 4 and 5, it will there be seen that a striker assembly or frame is denoted 40 as a whole. Said assembly includes a plurality of circular discs, collectively denoted 42, each of which is centrally apertured as at 43. Each circular disc is longitudinally spaced apart from and is parallel to its contiguous disc or discs and lies in a plane perpendicular to a longitudinal axis defined by said plurality of discs. The common axis of rotation of said circular discs is defined by a motor-driven shaft that extends through the circular apertures. The shaft is not depicted to avoid cluttering the drawing. The circular discs are keyed to the shaft for conjoint rotation therewith.

In the illustrated embodiment, there are sixteen (16) slots formed in each disc 42. Each slot is radially disposed relative to the rotational axis of the assembly. More particularly, the slots are grouped in pairs so that there are eight (8) pairs of slots formed in each end disc 42 and said pairs are equidistantly and circumferentially spaced with respect to one another. There being eight (8) pairs of slots in the end disc in this embodiment, each pair of slots is spaced forty five degrees (45°) from its contiguous pair of slots. The number of pairs of slots may be increased or decreased without departing from the scope of this invention.

A circular disc 42 that is not an end disc has twice as many slots, as depicted in FIG. 5. This is because an end disc, such as the disc at the left end of FIG. 5 as drawn, accommodates the first end of the elongate metal bars that hold strikers 10 in position whereas an intermediate disc, drawn to the right of said end disc in FIG. 5, receives the second end of said elongate metal bars as well as the first end of another set of said elongate metal bars.

There is one elongate slot and one truncate slot in each pair of slots.

Each elongate slot of each pair of slots is denoted 44. Each elongate slot 44 has three parts. The radially innermost part of each elongate slot is denoted 44a, the radially outermost part is denoted 44c, and the middle part that openly communicates with said inner and outermost parts is denoted 44b.

Each elongate slot 44 is adapted to receive a first elongate metal bar 46. Opposite ends 46a of said first elongate metal bar 46 thus extend through longitudinally-spaced elongate slots 44, 44 formed in contiguous discs and beyond the surface of each disc 42.

The circumferential extent of outermost part 44c of elongate slot 44 is about twice the thickness of first elongate metal bar 46. The circumferential extent of innermost part 44a is less than the circumferential extent of outermost part 44c but is greater than the thickness of said first elongate metal bar. The circumferential extent of the central part 44b is only slightly greater than the thickness of said first elongate metal bar.

Each truncate slot is sized to receive a second elongate metal bar. The second elongate metal bar is denoted 48 in FIGS. 4 and 5 and has an extent greater than the extent between two (2) contiguous discs 42. Therefore, its opposite ends 48a are received within truncate slots formed in contiguous discs 42 that are in longitudinal alignment with one another, and each opposite end extends through a truncate slot and beyond the surface of the disc so that it can be engaged by a yoking device disclosed hereinafter. Second elongate metal bar 48 is welded to the truncate slots that receive its opposite ends. This prevents sliding motion of said second elongate metal bar and increases the structural integrity of the striker assembly.

The truncate slots are not provided with reference numerals to avoid cluttering FIGS. 4 and 5 and to avoid confusing the slot with the end of the elongate metal bar 48 that occupies it. Significantly, each truncate slot is only slightly larger in size than the transverse cross-sectional size of its elongate metal bar so that the elongate metal bar is constrained against circumferential (clockwise or counterclockwise) or radial (towards or away from the center of the disc) movement.

When each set of elongate metal bars is properly installed, each end 46a of first elongate metal bar 46 is positioned within radially outermost end 44c of its associated elongate slot 44. This positions each end 46a of said first elongate metal bar in juxtaposition with an end 48a of a second elongate metal bar 48.

A yoking device 50 secures the respective ends 46a, 48a of first and second elongate metal bars 46, 48 to one another. Since second elongate metal bar 48 is confined within its truncate slot by the aforesaid welding and therefore held against circumferential or radial movement, yoking first elongate metal bar 46 to second elongate metal bar 48 serves to constrain said first elongate metal bar 46 against such movement. Yoking device 50 thus prevents the first elongate metal bar from sliding longitudinally from its respective slots.

When opposite ends 46a of first elongate metal bar 46 are in their respective radially outermost slots 44c, an extent of said first elongate metal bar is positioned in upwardly-opening, square "U"-shaped channel 20 formed in top wall 22 of striker head 14.

When opposite ends 48a of second elongate metal bar 48 are in their respective truncate slots, a part of said second elongate metal bar is positioned in downwardly-opening, square "U"-shaped channel 24 formed in bottom wall 26 of striker head 14. More particularly, a striker is lowered onto second elongate metal bar 48 so that said second elongate metal bar 48 enters into downwardly-opening channel 24. The striker is then displaced radially outwardly so that undercut 28 slides into engagement with a radially innermost edge of said stationary, welded second elongate metal bar, thereby locking said striker head into said downwardly-opening channel 24 of second elongate metal bar 48.

Head 14 of each striker 10 is thus held in sandwiched relation between each pair of first and second elongate metal bars.

When replacement of a striker 10 is necessary, no knives or shears are needed because head 14 is not cut from main body 12 as a part of the replacement procedure as is necessary with prior art structures. Nor is it required to remove any attachment rods. Instead, yoking device 50 is released from engagement with first elongate metal bar 46, at both ends 46a thereof. Said first elongate metal bar is displaced in a circumferential direction until it reaches its maximum spacing from second elongate metal bar 48. Said first elongate metal bar is then displaced radially inwardly so that it slides through center section 44b of elongate slot 44 and enters into radially innermost end 44a of said elongate slot. Upwardly-facing square "U"-shaped channel 20 is now no longer occupied by said first elongate metal bar 46.

Striker 10 is next displaced radially inwardly so that undercut 28 slides away from the radially innermost edge of stationary second elongate metal bar 48. Striker head 14 is then lifted from said second elongate metal bar 48 and striker 10 is deposited into a re-cycling bin for refurbishment.

Downwardly-opening square "U"-shaped channel 24 of a new striker 10 is then positioned over second elongate metal bar 48 and lowered so that said second elongate metal bar is fully received within said channel 24. The new striker is then pulled radially outwardly so that undercut 28 receives the radially innermost edge of stationary second elongate metal bar 48.

First elongate metal bar 46 is then lifted and displaced radially outwardly so that it exits radially innermost end 44a of elongate slot 44, slides through middle part 44b of said elongate slot, and enters into radially outermost end 44c of said elongate slot. Yoking device 50 is reattached to the respective ends of said first and second elongate metal bars and the replacement of the striker is completed.

Where two or more strikers are sandwiched between the first and second elongate metal bars, they may be replaced at the same time by following the above procedure, or one or more of them may be left in place if not damaged. There are two strikers sandwiched between each set of first and second elongate metal bars in the embodiment depicted in FIG. 3, but the invention is not restricted to that number of strikers, i.e., there could be one (1), two (2), three (3), or more strikers arrayed along the extent of each pair of first and second elongate metal bars between contiguous discs.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A striker assembly, comprising:
a generally cylindrical frame mounted for rotation about a longitudinal axis of symmetry;
a plurality of strikers disposed radially with respect to said longitudinal axis of symmetry;
each striker of said plurality of strikers having an elongate main body and a head formed integrally with said elongate main body at a radially inward end thereof;
a plurality of striker teeth formed in said elongate main body;
a square, upwardly-opening U-shaped channel formed in a top wall of said head;
a square, downwardly-opening "U"-shaped channel formed in a bottom wall of said head; and
an undercut in open communication with said square-downwardly-opening channel, said undercut extending in a radially-inward direction.

2. The striker assembly of claim 1, further comprising:
a plurality of circular discs, each of which is longitudinally spaced apart from a contiguous disc and is positioned in a plane perpendicular to said longitudinal axis of symmetry defined by said plurality of circular discs;
a plurality of slots formed in each disc, each slot being radially disposed relative to said longitudinal axis of symmetry;
said slots being grouped in pairs and said pairs being equidistantly and circumferentially spaced with respect to one another;
each pair of slots including one elongate slot and one truncate slot;
a first elongate metal bar having a parallelepiped structure and a length greater than a distance separating contiguous discs;
said first elongate metal bar having opposite ends adapted to slidingly fit within the elongate slot of each pair slots of contiguous circular discs;
each elongate slot of each pair of slots having three parts, including a radially innermost part, a radially outermost part, and a middle part that openly communicates with said inner and outermost parts;
a second elongate metal bar having a parallelepiped structure and a length greater than a distance separating contiguous discs; and
said second elongate metal bar having opposite ends adapted to slidingly fit within the truncate slot of each pair of slots.

3. The striker assembly of claim 2, further comprising:
said radially outermost part of said elongate slot having a circumferential extent about twice the thickness of said first elongate metal bar;
said radially innermost part of said elongate slot having a circumferential extent less than that of said radially outermost part but greater than a thickness of said first elongate metal bar;
said middle part of said elongate slot having a circumferential extent only slightly greater than said thickness of said first elongate metal bar;
each of said first elongate metal bars being positioned within the radially outermost part of their respective elongate slots, thereby positioning each end of each first elongate metal bar in juxtaposition with an end of said second elongate metal bar.

4. The striker assembly of claim 3, further comprising:
a yoking device for securing said first and second elongate metal bars to one another at their respective opposite ends;
whereby said second elongate metal bar, confined within its truncate slot and held against circumferential and radial movement, yokes said first elongate metal bar to said second elongate metal bar, thereby restricting said first elongate metal bar against such movement.

5. The striker assembly of claim 4, further comprising:
said yoking device adapted to prevent the first and second elongate metal bars from sliding longitudinally from their respective slots;
said first elongate metal bar having an extent thereof positioned in said upwardly-opening square "U"-shaped channel formed in said striker head when opposite ends of said first elongate metal bar are in their respective elongate slots;
said second elongate metal bar having an extent thereof positioned in said downwardly-opening, square "U"-shaped channel when opposite ends of said second elongate metal bar are in their respective truncate slots;
said second elongate metal bar being introduced into said downwardly-opening channel formed in said head of said striker and said striker being displaced radially outwardly so that a radially innermost edge of said second elongate metal bar slides into said undercut, thereby locking said second elongate metal bar into said downwardly-opening channel;
whereby the head of each striker is held in sandwiched relation between each pair of first and second elongate metal bars.

6. A striker, comprising:
an elongate main body;
a head formed integrally with said elongate main body at a radially inward end thereof;
a plurality of striker teeth formed in said elongate main body;

a square, upwardly-opening U-shaped channel formed in a top wall of said head; and a square, downwardly-opening "U"-shaped channel formed in a bottom wall of said head.

7. The striker of claim 6, further comprising:

an undercut in open communication with said square-downwardly-opening channel, said undercut extending in a radially-inward direction.

8. A method of installing strikers in a striker assembly, comprising the steps of:

providing a generally cylindrical frame mounted for rotation about a longitudinal axis of symmetry;

providing a plurality of strikers disposed radially with respect to said longitudinal axis of symmetry;

providing each striker of said plurality of strikers with an elongate main body and a head formed integrally with said elongate main body at a radially inward end thereof;

forming a plurality of striker teeth on a bottom wall of said elongate main body;

forming a square, upwardly-opening U-shaped channel in a top wall of said head;

forming a square, downwardly-opening "U"-shaped channel in a bottom wall of said head;

forming an undercut in open communication with said square-downwardly-opening channel, said undercut extending in a radially inward direction;

providing a plurality of circular discs, each of which is longitudinally spaced apart from a contiguous disc and is positioned in a plane perpendicular to a longitudinal axis defined by said plurality of circular discs;

forming a plurality of slots in each disc, each slot being radially disposed relative to the longitudinal axis of symmetry;

grouping said slots into pairs and spacing said pairs in equidistantly and circumferentially spaced relation to one another;

providing each pair of slots with one elongate slot and one truncate slot;

providing a first elongate metal bar having a parallelepiped structure and a length greater than a distance separating contiguous discs;

providing a second elongate metal bar having a parallelepiped structure and a length greater than a distance separating contiguous discs;

forming each elongate slot of each pair of slots into three parts, including a radially innermost part, a radially outermost part, and a middle part that openly communicates with said radially inner and outermost parts;

forming said radially outermost part of said elongate slot to have a circumferential extent about twice the thickness of said first elongate metal bar;

forming said radially innermost part of said elongate slot to have a circumferential extent less than that of said radially outermost part but greater than a thickness of said first elongate metal bar;

forming said middle part of said elongate slot to have a circumferential extent only slightly greater than said thickness of said first elongate metal bar;

slidingly inserting opposite ends of said first elongate metal bar into the radially innermost part of the elongate slot of each pair of slots formed in contiguous circular discs;

slidingly inserting opposite ends of said second elongate metal bar into the truncate slot of each pair slots;

positioning said downwardly-opening, square "U"-shaped channel formed in said head of said striker into engagement with an extent of said second elongate metal bar when opposite ends of said second elongate metal bar are in their respective truncate slots;

displacing said striker radially outwardly so that said undercut slidingly receives a radially innermost edge of said second elongate metal bar, thereby locking said downwardly-opening channel onto said second elongate metal bar;

displacing said first elongate metal bar in a circumferential direction within said radially innermost part of said elongate slot until said first elongate metal bar is aligned with said middle part of said elongate slot, and displacing said first elongate metal bar radially outwardly so that it exits said radially innermost part of said elongate slot, slides through said middle part of said elongate slot, and enters into said radially outermost part of said elongate slot;

providing a yoking device; and interconnecting said first and second elongate metal bars to one another at their respective opposite ends with said yoking device, said yoking device having a first end secured to said first elongate metal bar and a second end secured to said second elongate metal bar, so that said second elongate metal bar, being confined within said truncate slot and held against circumferential and radial movement, communicates said confinement to said first elongate metal bar, thereby restricting said first elongate metal bar against circumferential and radial movement and so that said yoking device prevents the first and second elongate metal bars from sliding longitudinally from their respective slots.

9. A method of removing strikers in a striker assembly of claim 8, comprising the steps of:

releasing said yoking device from engagement with said opposite ends of said first elongate metal bar;

displacing said first elongate metal bar in a circumferential direction until it reaches a maximum spacing from said second elongate metal bar;

displacing said first elongate metal bar radially inwardly so that it slides through said middle part of said elongate slot and enters into said radially innermost part of said elongate slot so that said extent of said first elongate metal bar no longer occupies said upwardly-facing square "U"-shaped channel;

displacing said striker radially inwardly so that said undercut is displaced away from the radially innermost edge of said second elongate metal bar; and lifting said striker head from said second elongate metal bar.

* * * * *